United States Patent [19]

Shenton

[11] Patent Number: 5,199,744
[45] Date of Patent: Apr. 6, 1993

[54] SECURITY DEVICE

[75] Inventor: Colin Shenton, Surrey, England

[73] Assignee: De La Rue plc, London, England

[21] Appl. No.: 917,960

[22] Filed: Jul. 24, 1992

Related U.S. Application Data

[63] Continuation of Ser. No. 659,383, filed as PCT/GB89/01000, Aug. 29, 1989, published as WO90/02658, Mar. 22, 1990, abandoned.

[56] References Cited

U.S. PATENT DOCUMENTS

| | | | |
|---|---|---|---|
| 1,299,484 | 4/1919 | Lee | 283/94 |
| 4,033,059 | 7/1977 | Hutton et al. | 283/91 |
| 4,588,212 | 5/1986 | Castagroli | 283/72 |
| 4,715,623 | 12/1987 | Roule et al. | 283/91 |

FOREIGN PATENT DOCUMENTS 194042 10/1986 European Pat. Off. .

*Primary Examiner*—P. W. Echols
*Assistant Examiner*—David P. Bryant
*Attorney, Agent, or Firm*—Oliff & Berridge

[57] ABSTRACT

A substrate, such as a banknote or travellers' check, carries a security device including in association at least one embossed transitory image, such as a latent or transient image and an embossed linear area. The arrangement is such that when the embossed region of the substrate is viewed from different angles each image and linear area can be visually discerned.

25 Claims, 2 Drawing Sheets

SECURITY DEVICE

This is a continuation of application Ser. No. 07/659,383 filed as PCT/GB89/01000 filed Aug. 29, 1989, published as WO90/02658, filed Mar. 22, 1990, now abandoned.

BACKGROUND OF THE INVENTION

The invention relates to security devices for use on documents of value, and in particular for use on banknotes and travellers' checks.

There is a continuing need to prevent the counterfeiting of valuable documents such as banknotes, checks, travellers checks, share certificates, stamps, plastic cash, credit and charge cards and the like. There is also a need for there to be facile authentication of the documents.

The continuing improvement in commercial printing and photocopying technology particularly requires that more advanced security features have to be created.

While machine readable features provide a useful line of defense, it is often useful to employ visual features or effects which can be noticed by a large number of people while the document is in use. This is particularly so for banknotes and other monetary instruments.

Embossing technology, for example as used in intaglio printing banknotes, has proved to be particularly useful in minimizing counterfeiting relative to other printing techniques. All banknotes contain some intaglio printing which may be additional to security printing applied by other techniques such as offset lithography. In practice the intaglio printing is undertaken as the last stage of printing except that numbers may subsequently be added, typically by letterpress printing.

It is known to undertake "blind embossing" where the intaglio plate only confers a surface profile to the substrate, without any ink being applied, for example as disclosed in U.S. Pat. No. 4,715,623.

An intaglio imprint is obtained by pressing a suitable substrate against an engraved and inked plate so as to deform the medium into the ink-bearing recesses of the plate. The resultant impression constituting a pattern formed of spaced and raised ink lines with optionally other pattern elements is characterised by superior clarity and sharpness of appearance and cannot be copied with sufficient fidelity to escape expert detection.

Examples of embossed, latent images are shown in U.S. Pat. No. 4,033,059, U.S. Pat. No. 4,715,623 and EP-A-194042. Such transitory images are generally difficult to see and are occasionally discrete, hidden, visual features.

BRIEF SUMMARY OF THE INVENTION

While this invention will be described with particular reference to banknote production it will be appreciated that other methods of embossing such as by the use of conventional embossing stamps may be used. This will have particular relevance for embossing during metallic foil stamping processes.

In accordance with one aspect of the present invention, a method of providing a security device on a substrate comprises embossing at least one transitory image, and a linear area which is visible when the device is examined from substantially all viewing angles.

In accordance with a second aspect of the present invention, a substrate carries a security device comprising in association at least one embossed transitory image, and an embossed linear area which is visible when the device is examined from substantially all viewing angles.

By embossing at least one transitory image and a linear area it is possible to provide a security device which is extremely difficult to copy without detection. The device provides greater visual impact, being more noticeable. Such an increased perception of the device assists against counterfeiting.

In this specification, a "transient image" is one which can be seen when viewing the substrate normally but not when the substrate is viewed off normal, while a "latent image" is one which cannot be seen when viewing the substrate normally but which can be seen when the substrate is viewed from certain off normal angles. The term "transitory image" is intended to be generic to both transient and latent images. The "linear area" is an embossed area, the embossing being such that the area is viewable from substantially all viewing angles. Generally, the area will be formed by an embossed line.

Generally, the region of the substrate carrying the security device will be reflective although in some cases a monochrome color could be used. In this case, the reflective region is provided by a reflective material or monochromatic ink which is deposited on the substrate, for example by printing, although in some cases the substrate itself could be made of a suitable material.

In the preferred embodiment the transitory images and linear area are embossed by an intaglio printing process with an uninked intaglio plate at the same time as intaglio printing is carried out on other regions of the substrate. This could be done using separate plates or different regions of a common plate.

The substrate to be embossed will normally be paper, preferably security printed paper, although plastic deformation of plastic films and paper/plastic laminates is also possible. The embossed area will always, if paper, be prior printed with an ink by offset lithography. For most practical purposes this will mean depositing an area sufficient in size to contain the whole of the security device.

The security paper will for example be banknote or check quality paper which has received security indicia applied by offset lithography under normal security printing conditions.

The surface to be embossed should preferably in whole or part be specularly reflecting. The ink will normally be metallic or have a metallic appearance, although embossing colored or white glossy paper surfaces and non-specular paper surfaces is also possible.

For added security the background metallic ink may be printed in rainbow printing fashion either by using another metallic ink or in rainbow combination with a non-specularly reflecting ink. Thus for example there may be an area produced for embossing which has a central band of non-specular color flanked by metallic colors.

The metallic printing may have a colored metallic appearance for example by using Pantone Inc. colored metallic inks for non-durable security applications, or for durable applications the colored metallic printings described in British Patent Application No. 8908049.3. The metallic ink could be overprinted with a tinting lacquer for colored metallic effects.

All of the lithographic printing will typically be applied on one pass through the printing press.

Several different combinations of transitory image(s) and linear areas can be used. For example, more than one transitory image may be provided and these could be the same type i.e. transient or latent or a mixture of the two. The linear area could be provided completely or partly around each transitory image or extend through the image. Furthermore, the linear area could be rectilinear or curved. Where more than one transitory image is provided these may be overlapped or be spaced apart.

In the case of each transitory image, these will generally be formed by at least five and normally at least ten abutting parallel embossing lines of equal spacing and depth. The angles at which the engraving channels are cut, their depths, widths, spacings, and orientations are the conventionally variable factors which can be employed to create transient and latent effects.

In practice for a given transitory design element there will generally be only one engraving depth. In the composite device there will generally only be one or two engraving depths used for the transitory images.

It is possible for the parallel rulings in the transitory images to be made to intersect to create more complicated patterns.

Linear areas will preferably have a depth at least that of the shallowest transient images used in a given security device. The width of the linear areas will generally be at least that of an individual transitory image line.

Linear areas used with transitory images may be placed at the edge of a single transitory element (or a combination of transitory elements), or may themselves define a shape which crosses a transitory image.

The linear area may be used to define one part of a security device. For example, there may be a figurehead outline design which is depicted by a linear area in the form of a perimeter line. Inside the perimeter and parallel to this first area there may be second, third and if necessary further linear areas. The design element therefore will have the appearance of multiple parallel tracks.

The tracks may not necessarily be precisely parallel. For example, the tracks may gradually take on the form of an inner design element, the tracks changing progressively from the outer to the inner.

Curving linear areas have the advantage that by presenting continuously varying angles of deep embossing, interference will occur on attempted photoreproduction.

The linear area must be visible at all angles of viewing or at the least at angles where the transitory features are not readily visible. In practice this means that the linear area should be sufficient to circumscribe or define an identifiable portion of the design element. This will preferably be in the form of a substantially continuous line although the line may be segmented.

Although continuous curving embossed lines may be used satisfactorily the linear areas may be formed from a plurality of lines.

Thus the linear area may be composed of a number of parallel lines and these may have discontinuities so that one may be interrupted while the others continue. The spacing between the parallel lines may be generally set sufficiently fine so as to interfere with photoreproduction screens. Because the linear area takes up all orientations, copying by use of color printing separation photography or scanning, and electrophotographic color copying is substantially inhibited.

The spacing between the linear areas need not be exactly parallel; controlled divergence may be allowed so that the spacing and widths are wider at one part than another. Alternatively the inner areas may vary in direction or thickness in a regular manner while being confined within the limits of inner and outer linear areas.

The linear area itself may also change width in a continuous or stepped manner. Where the linear area intersects with a transitory image line there may be a local thickening at the junctions.

The linear area may split into two continous lines. In the area between the split lines there may be placed further linear areas, or a transitory image rulings.

The linear "area" may be composed of a number of fine lines transversing the width of the linear area. These lines may have a set orientation, say with respect to one side of the security document, or they may change their angle of orientation, for example forming a radial line effect.

The depths of the linear areas will generally be constant within the whole device.

Typically, the substrate would be a document of value, for example a banknote, a check, a traveller's check, a share certificate, a stamp, plastic cash, or a credit or charge card.

BRIEF DESCRIPTION OF THE DRAWINGS

Some examples of methods of providing a security device according to the invention will now be described with reference to the accompanying drawings, in which.

DETAILED DESCRIPTION

In these examples banknote paper is used as a substrate. However, ordinary paper, plastic films, metallised films or any other permanently deformable material may be used.

Prior to providing a security device on the banknote by embossing, the banknote will normally have been lithographically printed with security designs and the ink allowed to dry. Normally a number of different colors of ink are printed lithographically on the banknote.

Then, generally during the same printing pass, the region of the banknote on which the security device is to be printed is printed with a metallic ink. Typically this would be provided by a silver offset lithographic ink such as is described in our European Patent Application No. 87305914.1. However, it would be possible to use a gold or other colored ink. This provides a smooth, even surface on which to carry out a subsequent embossing operation.

After the metallic ink has been applied to the banknote it is ready to be intaglio printed.

Figure 1:
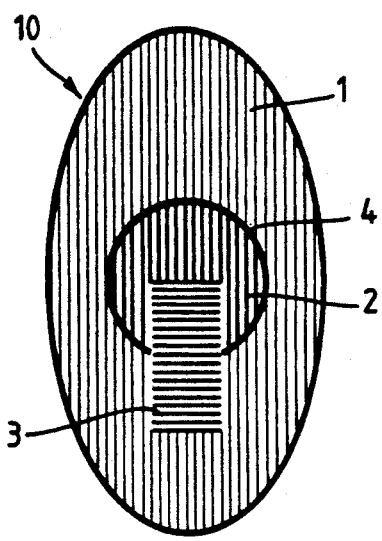
FIGS. 1 to 16 comprise enlarged views of sixteen different examples of security devices.

In the FIG. 1 example, during the intaglio printing process two transitory images 2,3 are embossed on the metallic ink and the same intaglio plate is used for both the intaglio printing (not shown) and the embossing. It would of course be possible to perform the embossing by using a separate plate.

FIG. 1 illustrates a final security device 10 having an elliptical background 1 formed by vertical, embossed parallel lines which contains a first (circular) transitory image 2 formed by wider, embossed parallel lines, and a partially overlapping (second) rectangular transitory image 3 formed by horizontal, embossed parallel lines. The periphery of the first transitory image 2 is outlined by an embossed, closed perimeter line 4 which is continuous in nature except where it intersects the rectangle 3. The width of the parallel lines and their spacing varies as can be seen in FIG. 1. A single embossing depth is intended with this example since variations in line width are used to differentiate between the images. However, different embossing depths could be employed alternatively or additionally.

Figure 2:
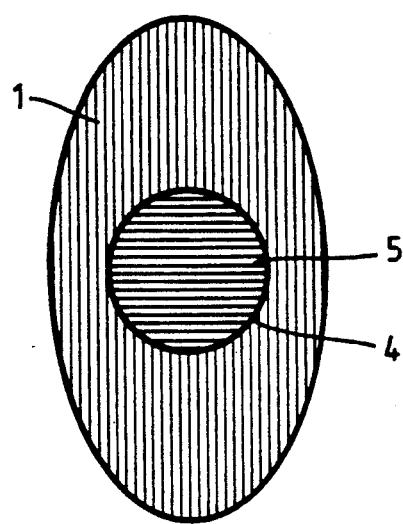

The FIG. 2 example has an elliptical background 1, as in FIG. 1, but only a single transitory image 5 formed by horizontal, embossed lines within a circular, substantially continuous perimeter line 4. The width and spacing of the parallel lines within the background and image respectively differs as shown in the drawing.

Figure 3:
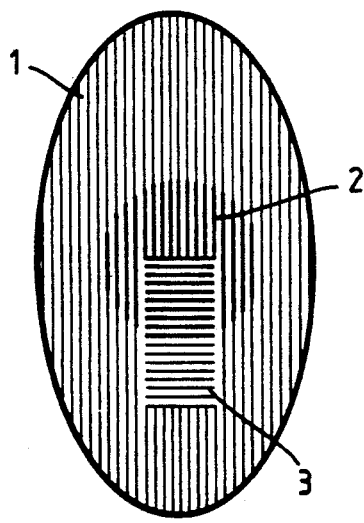

FIG. 3 illustrates a device similar to the FIG. 1 device but in which the perimeter line 4 has been omitted. In this case, the images are defined solely by differences in the width and orientations of the embossed, parallel lines. In this case, it is preferable if at least one of the images is a transient image.

Figure 4:
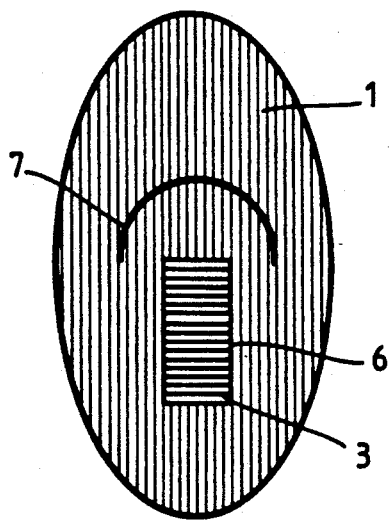

In the FIG. 4 example, the elliptical background 1 contains two images. The first image comprises a rectangular, transient image 3 defined by horizontally extending embossed lines and, in this case, being surrounded by a perimeter line 6 (although this is optional) and a second image comprising a continuous embossed line 7 in the form of a semi-circle which does not have its interior differentiated by a distinguishing line structure. In other examples, the embossed line 7 could be closed.

Figure 5:
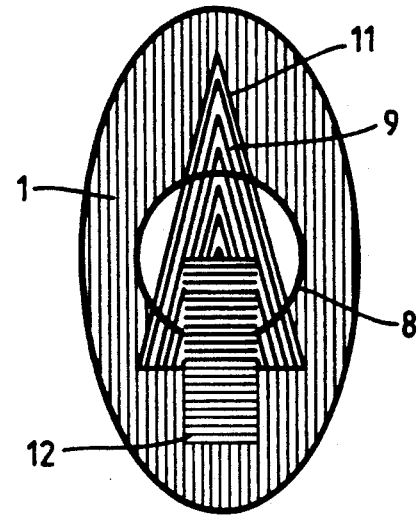

The FIG. 5 example illustrates a more complex device which is again provided on an elliptical, embossed background region 1. This device contains a first image 8 defined by a continuous, circular embossed line; a first transitory image 9 in the form of a triangle bearing two directions of parallel line arrangements and which is bounded by a perimeter outline 11; and a second transitory image 12 in the form of a rectangle which is not bounded by a perimeter line but which is differentiated from the background by a different orientation of the parallel, embossed lines. Where the various elements intersect, variations in line structure or width may be made or the structure of one element may take priority over another.

Figure 6:
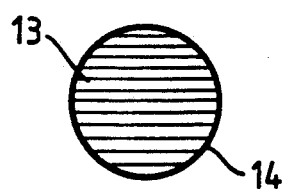

FIG. 6 illustrates a transitory image 13 within a continuous perimeter line 14.

Figure 7:
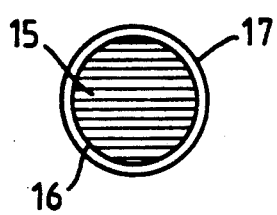

FIG. 7 shows a transitory image 15 with a continuous perimeter line 16 around the border of the image 15 and a further perimeter line 17 concentric with the line 16 but spaced from it.

Figure 8:
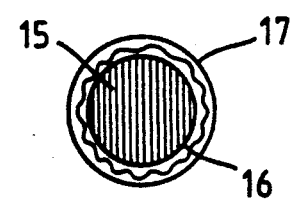

FIG. 8 is similar to FIG. 7 but an internal structure is provided between the perimeter lines 16, 17.

Figure 9:
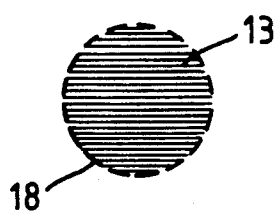

FIG. 9 is similar to FIG. 6 but the perimeter line 18 is discontinuous.

Figure 10:
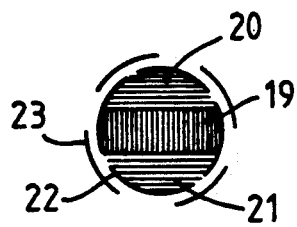

FIG. 10 illustrates a transitory image 19 positioned between two transitory images 20, 21 of a different type from the image 19, the transitory images being surrounded by a pair of discontinuous perimeter lines 22, 23.

Figure 11:
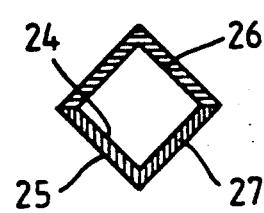

FIG. 11 shows two square perimeter lines 24, 25 defining between them a region containing two transitory images of different type 26, 27.

Figure 12:
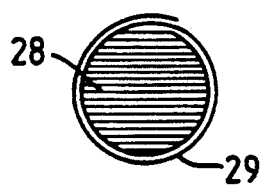

FIG. 12 shows a transitory image 28 around which extends a spiral line 29.

Figure 13:
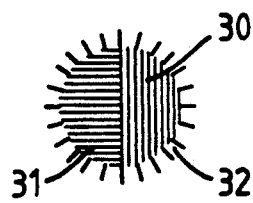

FIG. 13 illustrates a pair of transitory images 30, 31 of different type around which is provided a linear region or border defined by a set of radially outwardly extending embossed lines 32.

Figure 14:
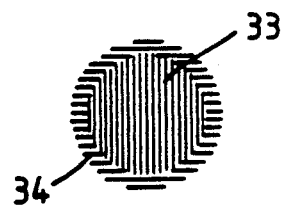

FIG. 14 shows a single transitory image 33 surrounded by a linear border region 34 formed by a set of parallel lines.

Figure 15:
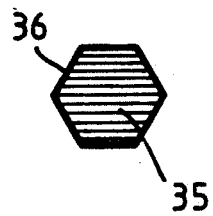
Figure 16:
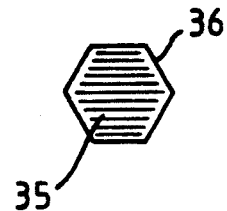

FIG. 15 shows a transitory image 35 surrounded by a hexagonal perimeter line 36 while FIG. 16 is similar to FIG. 15 but the perimeter line 36 is spaced from the image 35.

In all these examples, except where stated otherwise, the transitory images may comprise latent or transient images.

It will be appreciated that the lighting conditions can alter the visual appearance. For example low angle lighting from a point will cause shadows.

The appearance changes because of different degrees of reflectivity, masking and shading. Sometimes a given transient image will be darker than the other areas, sometimes lighter or sometimes it will be difficult to distinguish having little contrast with the surroundings.

The benefit of the perimeter line is that it more distinctly defines a shape when the device is viewed from immediately above. Normal latent imaging techniques would not allow any image to be distinctly viewable from above as latent images are designed only to be revealed at low angle viewing.

I claim:

1. A method of providing a security device on a region of a substrate, the method comprising blind embossing the substrate with at least one transitory image, and with a non-transitory linear area which is visible when the device is examined from substantially all viewing angles.

2. A method according to claim 1, wherein the blind embossing is carried out using an un-inked intaglio plate.

3. A method according to claim 2, wherein other parts of the substrate are intaglio printed simultaneously with the blind embossing.

4. A method according to claim 1, wherein the area of the substrate to be blind embossed is preprinted with an ink by offset lithography.

5. A substrate carrying a security device comprising in association at least one blind embossed transitory image, and a blind embossed non-transitory linear area which is visible when the device is examined from substantially all viewing angles.

6. A substrate according to claim 5, wherein the linear area at least partly borders the at least one transitory image.

7. A substrate according to claim 6, wherein the transitory image comprises a latent image, and wherein the linear area defines a shape which is visible from all angles at which the latent image is not visible.

8. A substrate according to claim 6, wherein the linear area defines a perimeter line bordering the entire transitory image.

9. A substrate according to claim 5, wherein the linear area is continuous.

10. A substrate according to claim 5, wherein the linear area is curved.

11. A substrate according to claim 5, wherein the linear area is defined by a number of substantially parallel embossed lines.

12. A substrate according to claim 11, wherein the lines extend transversely to the length of the linear area.

13. A substrate according to claim 5, wherein the thickness of the linear area varies along its length.

14. A substrate according to claim 5, comprising a number of embossed linear areas.

15. A substrate according to claim 5, wherein the linear area is embossed to a depth at least equal to the shallowest depth to which the at least one transitory image is embossed.

16. A substrate according to claim 5, wherein the at least one transitory image is a transient image.

17. A substrate according to claim 5, wherein the security device includes a transient image and a latent image.

18. A substrate according to claim 17, wherein the images are superimposed on each other.

19. A substrate according to claim 5, wherein the substrate is specularly reflecting.

20. A substrate according to claim 5, wherein the substrate carries a metallic ink.

21. A substrate according to claim 5, wherein the substrate carries rainbow printing.

22. A substrate according to claim 21, wherein the rainbow printing is metallic.

23. A substrate according to claim 5, wherein the substrate comprises a banknote or traveller's check.

24. A substrate according to claim 5, wherein the linear area defines one part of the security device.

25. A substrate according to claim 5, wherein the linear area comprises a line defining the perimeter of an image.

* * * * *